United States Patent Office 2,694,045
Patented Nov. 9, 1954

2,694,045
STABILIZER FOR PETROLEUM PRODUCTS

Allen R. Jones, Roselle, and John O. Smith, Jr., North Plainfield, N. J., assignors to Standard Oil Development Company, a corporation of Delaware No Drawing. Application December 14, 1951, Serial No. 261,752

11 Claims. (Cl. 252—47.5)

This invention relates to additives for use in stabilizing organic materials which are susceptible to oxidation and/or polymerization on contact with air or oxygen, and particularly for use in mineral lubricating oils and other petroleum hydrocarbon products.

It is well known in the art to utilize various addition agents in organic compositions in order to prevent the oxidation of the latter, which results in the production of undesirable degradation products such as peroxides, acidic materials, sludge, varnish-like deposits, and the like. This is particularly the case with respect to hydrocarbon products, both saturated and unsaturated, which are utilized as diesel fuels, motor fuels, and lubricants, including instrument oils, turbine oils, motor oils, greases, emulsifiable oils, and the like. These products are often subject to severe operating conditions of temperature and pressure which tend to aggravate the oxidation reaction. Furthermore, oxidation of the product, either during storage or use, causes undesirable results with respect to the metal surfaces, such as the parts of an internal combustion engine in which the products are used. Corrosion and pitting of the metal surfaces occur as well as various other effects which hinder the efficient operation of the engine. A new class of oxidation inhibitors has been discovered which efficiently reduce the undesirable effects of the oxidation reaction and which are particularly effective in reducing corrosion of metal surfaces and in inhibiting the tendency of oil to produce an insoluble sludge. The inhibitors are also effective in other types of petroleum oil products such as fuel oils in which they reduce the tendency of the oil to darken and to produce sludge.

The new class of oxidation inhibitors may be described as the thiocyanate derivatives of the reaction products of an aryl sulfonyl halide with a nitrogen-containing compound such as pyridine, quinoline, acridine, or their derivatives as hereinafter more explicitly defined. The aryl sulfonyl halides generally react with the pyridine or similar compounds at room temperature and without the use of a catalyst, but temperatures in the range of about 0° to 100° F. may be employed. The reaction generally involves equimolar quantities of reactants. The use of equimolar quantities is preferred; however, other ratios may be used and unreacted material may be removed or left in the product as a diluent.

The nitrogen-containing compounds which are employed in preparing the antioxidants of the present invention may be more exactly defined as aza aromatic compounds of the formulas:

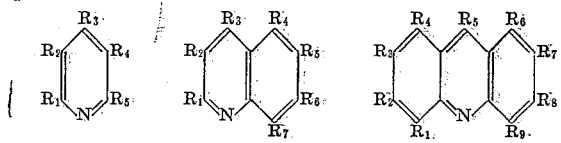

where R1 to R9 represent hydrogen and hydrocarbon groups containing 1 to 20 carbon atoms. The hydrocarbon groups may, for example, be alkyl, alkenyl, cycloalkyl, aryl, or terpenic groups, or combinations of such groups. It is preferable, although not necessary, that the groups adjacent to the nitrogen atom in the ring, when such groups are alkyl groups, have at least one hydrogen atom attached to the carbon atom which is adjacent to the nucleus. Examples of these compounds are pyridine, picolines, lutidines, ethylpyridines, collidine, methylethylpyridines, conyrine, parvoline, 2-benzylpyridine, 3-phenylpyridine, quinoline, quinaldine, lepidine, dimethylquinolines, ethylquinolines, 2-phenylquinoline, tetracoline, acridine, 5-methylacridine, 5-phenylacridine and the like.

The aryl sulfonyl halides employed in forming the reaction product with the above nitrogen containing compounds have the general formula:

where R' is an aryl or alkaryl group having from 6 to 30 carbon atoms, such as benzene, naphthalene, anthracene and their alkyl derivatives, and X is a halogen such as chlorine, bromine and the like. Alkaryl groupings may have alkyl groupings having relatively few carbon atoms if the final product is used as an additive for motor fuels and the like whereas side chains having from 8 to 20 carbon atoms may be used to increase oil solubility of the final product for use in lubricants and the like. Specific compounds include benzene sulfonyl chloride, p-toluene sulfonyl chloride, 2-n-hexadecyl benzene sulfonyl chloride, naphthalene sulfonyl chloride and 4-isooctyl benzene sulfonyl chloride.

The structure of the addition product formed by the reaction of the aryl sulfonyl halide with a nitrogen base of the type described above is not known with certainty, but is is possible that the product has the composition illustrated by the formula:

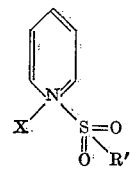

where X and R have the meanings defined in connection with the above formula, R'—SOOX.

The above product is then modified by replacing the halogen atom, introduced by means of the sulfonyl halide, with a thiocyanate radical, NCS—. This is generally accomplished by treating the reaction product prepared according to the method described above with an alkali metal thiocyanate, preferably in alcoholic solution, followed by filtration to remove alkali metal halide. This reaction is also generally carried out at room temperature, although the temperature may range from about 0° to about 100° C. The amount of the metal thiocyanate which is employed is normally that which is theoretically eqivalent to the halogen introduced into the first reaction product by means of the sulfonyl halide. The constitution of the reaction product is not known with certainty, but it is possible to consider this product as having the constitution represented by the formula:

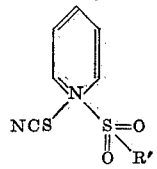

where R' has the meaning defined above.

Potassium thiocyanate, sodium thiocyanate and other such salts may be used. Under some conditions it may be desired to use thiocyanic acid in carrying out the reaction.

The products prepared in accordance with the methods described above may of course be employed in hydrocarbon oils without the presence of other antioxidants, but it has been found to be particularly advantageous to employ these products in combination with an antioxidant of the type of 2,6-di-tert.-butyl-4-methylphenol. This compound is a powerful antioxidant in itself, but in combination with the new additives of the present invention the antioxidant and corrosion preventing effects are even greater than would be expected from the known properties of the two additives when used separately.

The quantity of the additives of the present invention which may be most advantageously blended in mineral lubricating oils or other petroleum hydrocarbon products will depend upon the nature of the base oil to which they are added and upon the conditions to which the oil is to be subjected in use or in storage. Generally, the amount which may be advantageously employed will vary from about 0.005 to 2% by weight although quantities as great as 5% or more may on occasion be used. Concentrates containing from about 20 to 50% or higher of the additive in a hydrocarbon oil such as a lubricant may be prepared for storage and shipment. Solubilizers may be used to increase additive solubility if necessary.

In the following examples, various preparations and tests of additives prepared in accordance with the present invention will be described in detail, but it is to be understood that these examples are illustrative only and should not be considered as limiting the scope of the invention in any way.

*Example 1*

Equal molecular proportions of benzene sulfonyl chloride and 2,6-lutidine were mixed at room temperature. After an hour the mixture was placed on a steam bath for two hours to complete the reaction. After cooling, grayish crystals were formed; the product was believed to be benzene sulfonyl-2,6-lutidinium chloride.

*Example 2*

28.3 gms. of the product of Example 1 and 100 ml. of ethyl alcohol containing 9.7 gms. of potassium thiocyanate were mixed at room temperature. The KCl formed was removed by filtration, and the product, believed to be benzene sulfonyl 2,6-lutidinium thiocyanate was recovered by crystallization as orange-red crystals.

*Example 3*

Equal molecular proportions of benzene-sulfonyl chloride and quinoline were reacted in accordance with the procedure of Example 1 and the resulting product was then reacted with KSCN by the procedure of Example 2. The resulting filtered product was believed to be benzene sulfonyl quinolinium thiocyanate.

*Example 4.—Staeger oxidation test*

Lubricating oils were prepared by adding small quantities of the product prepared as described in Example 3 to a turbine oil consisting of a solvent extracted Mid-continent oil having a Saybolt viscosity of 43 seconds at 210° F., with and without the presence of 0.2% of 2,6-di-tert.-butyl-4-methyl phenol, and in every case with the further addition of 0.075% by weight of a zinc naphthenate corrosion inhibitor. The blends were tested in accordance with a modified Staeger oxidation test, which was conducted as follows: The test consisted essentially of storing a 200 ml. sample of oil in a rotating shelf oven maintained at 110°±1° C. A 40 x 70 mm. freshly polished copper strip was placed in the 400 ml. oil container to serve as an oxidation catalyst. The strip was removed every 72 hours and a clean strip substituted. During the test, the shelf rotated at an angular velocity of 4–6 R. P. M., and a positive ventilation of 1.5 to 2.0 cu. ft. of air per hour was maintained. Oil samples were periodically withdrawn from the container and the neutralization number was determined. The oxidation life of the sample is defined as the time in hours required to obtain an increase in neutralization number of 0.20 mg. KOH/g. and is determined by graphical interpolation.

A sample of the base oil with 0.075% zinc naphthenate rust inhibitor showed a life of 37 hours. The results obtained in similar tests of samples of the base oil with 0.075% zinc naphthenate and 0.01 or 0.02 percent of the products of Example 3, with and without the further addition of 0.2% of 2,6-di-tert.-butyl-4-methyl phenol, are shown in the following table:

TABLE I

| Antioxidant | Concentration (wt. percent) | Staeger Oxidation Life (Hours) | |
|---|---|---|---|
| | | Base Oil[1] | Base Oil[1] + 0.2% 2, 6. di-tert.-butyl-4-methyl-phenol |
| None | 0.0 | 37 | 215 |
| Example 3 Product | 0.02 | 44 | |
| Do | 0.01 | | 345 |

[1] Containing 0.075% by weight of zinc naphthenate.

Very small concentrations of the inhibitor of the present invention have good oxidation inhibiting properties, and a synergistic improvement was obtained when used in combination with 2,6-di-tert.-butyl-4-methylphenol.

*Example 5.—Engine deposition test*

The effect of the inhibitor of the present invention in inhibiting sludge formation in internal combustion engines was determined by employing a used lubricating oil from a Chevrolet engine test. This test, known as the C. R. C. FL–2 low temperature engine test, was conducted with a solvent extracted Mid-Continent paraffinic oil of 46 seconds Saybolt viscosity at 210 F. and 100 V. I. to which had been added 0.8% polybutene to give an oil of 125 V. I. and 52 seconds viscosity at 210° F. as the crankcase lubricant. The gasoline employed was one of high deposit-forming tendency containing untreated thermally and catalytically cracked stocks. Engine operating conditions approximated 50 M. P. H. at about road load for 40 hours or were equivalent to about 2000 miles of operation. The filtered oil (50 ml.) from this engine test was stored for two weeks in 250 ml. glass stoppered Erlenmeyer flasks at 190° F. with and without 0.02 weight percent of the inhibitor of Example 2. After the two weeks' storage period, the sludge which had formed was removed by filtration and de-oiled by washing with heptane. The results, given as the amount of sludge remaining after the heptane washing, are shown in the following table.

TABLE II

Additive: Heptane insoluble sludge (mg.)
None _____ 148
Product of Example 2 (0.02 weight percent) ___ 88

These results show that the inhibitor was effective in markedly reducing the amount of sludge formed from reactive oil-soluble material present in the used lubricating oil. In the C. R. C. FL–2 engine test, the effects of fuel composition on engine deposit formation are accentuated by the relatively low jacket and crankcase oil temperatures of 95° and 165° F., respectively. Unburned and partially oxidized high boiling fuel fractions become dissolved in the lubricating oil where they further oxidize and polymerize to undesirable insoluble varnish and sludge deposits. Thus, although a motor lubricant may be satisfactorily stable under these engine operating conditions, the addition to the lubricant of the inhibitors described above will minimize engine deposits attributable to the fuel.

*Example 6.—Fuel oil stabilization test*

The reaction product of benzene sulfonyl chloride, 2,6-lutidine and potassium thiocyanate (Example 2) was tested as a fuel oil inhibitor. In this test, 0.02 percent by weight of the additive was blended with 200 g. of a distillate hydrocarbon fuel made up of straight run and catalytically cracked petroleum fractions boiling in the range of 320° F. to 660° F. and placed in a 16 oz. clear glass bottle, which was stored for 10 days with partial exposure to sunlight. A similar sample of the fuel oil containing no inhibitor was stored in the same manner. After the ten-day period, the oil containing no additive had formed a large amount of sludge and had darkened considerably in color, while the sample containing the inhibitor contained only a very small amount of sludge and had darkened only slightly, the reduction in sludge formation being about 80 to 90%.

The products of the present invention may be employed not only in ordinary hydrocarbon lubricating oils but also in the "heavy duty" type of lubricating oils which have been compounded with such detergent-type additives as metal soaps, metal petroleum sulfonates, metal phenates, metal alcoholates, metal alkyl phenol sulfides, metal organo phosphates, phosphites, thiophosphates, and thiophosphites, metal xanthates and thioxanthates, metal thiocarbamates, and the like. Other types of additives, such as phenols and phenol sulfides, may also be present.

The lubricating oil base stock used in the compositions of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced by solvent extraction with solvents such as phenol, sulfur dioxide, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coil tar fractions and coal tar or shale oil distillates may also be used. Also, for special applications, animal, vegetable or fish oils or their hydrogenated or voltolized products may be employed in admixtures with mineral oils.

For the best results the base stock chosen should normally be an oil which without the new additive present gives the optimum performance in the service contemplated. However, since one advantage of the additives is that their use also makes feasible the employment of less satisfactory mineral oils, no strict rule can be laid down for the choice of the base stock. The additives are normally sufficiently soluble in the base stock, but in some cases auxiliary solvent agents may be used. The lubricating oils will usually range from about 40 to 150 seconds (Saybolt) viscosity at 210° F. The viscosity index may range from 0 to 100 or even higher.

Other agents than those which have been mentioned may be present in the oil composition, such as dyes, pour point depressants, heat thickened fatty oils, sulfurized fatty oils, sludge dispersers, antioxidants, thickeners, viscosity index improvers, oiliness agents, resins, rubber, olefin polymers, and the like.

Assisting agents which are particularly desirable as plasticizers and defoamers are the higher alcohols having preferably 8–20 carbon atoms, e. g., octyl alcohol, lauryl alcohol, stearyl alcohol, and the like.

In addition to being employed in lubricants, the additives of the present invention may also be used in other mineral oil products such as motor fuels, fuel oils, hydraulic fluids, torque converter fluids, cutting oils, flushing oils, turbine oils, transformer oils, industrial oils, process oils, and the like, and generally as antioxidants in mineral oil products. They may also be used in gear lubricants, greases and other products containing mineral oils as ingredients.

What is claimed is:

1. A composition consisting essentially of a major amount of a mineral oil susceptible to oxidation and a minor amount sufficient to inhibit oxidation, of the thiocyanate derivative of a product obtained by reacting a compound selected from the group consisting of pyridine, picolines, lutidines and quinoline with an aryl sulfonyl halide substantially at room temperature to form an addition product wherein the halogen radical of said addition product is replaced by the NCS-radical.

2. A composition according to claim 1 in which the mineral oil is a mineral lubricating oil.

3. A composition according to claim 1 in which the aryl group of said sulfonyl halide has from 6 to 30 carbon atoms.

4. A composition according to claim 1 in which said aryl sulfonyl halide is benzene sulfonyl chloride.

5. A composition according to claim 1 containing in addition an oxidation inhibiting amount of 2,6-di-tert.-butyl-4-methylphenol.

6. As a new composition of matter the rection product of an alkali metal thiocyanate with the product obtained by reacting 2,6-lutidine and benzene sulfonyl chloride at room temperature.

7. A composition comprising a major amount of a mineral oil susceptible to oxidation and a minor amount sufficient to inhibit oxidation, of the composition of claim 6.

8. The compositon of claim 7 containing in addition a minor oxidation inhibiting amount of 2,6-di-tert.-butyl-4-methylphenol.

9. As a new composition of matter the reaction product of an alkali metal thiocyanate with the product obtained by reacting quinoline and benzene sulfonyl chloride at room temperature.

10. A composition comprising a major amount of a mineral oil susceptible to oxidation and a minor amount sufficient to inhibit oxidation, of the composition of claim 9.

11. The composition of claim 10 containing in addition a minor oxidation inhibiting amount of 2,6-di-tert.-butyl-4-methylphenol.

References Cited in the file of this patent

UNITED STATES PATENTS

| Number | Name | Date |
|---|---|---|
| 2,537,428 | Seon et al. | Jan. 9, 1951 |

FOREIGN PATENTS

| Number | Country | Date |
|---|---|---|
| 18,516 | Great Britain | 1894 |

OTHER REFERENCES

Fieser et al.: "Organic Chemistry," D. C. Heath, Boston, 1944, page 32.